United States Patent [19]
Prosser

[11] Patent Number: 5,357,301
[45] Date of Patent: Oct. 18, 1994

[54] CAMERA HAVING INTERCHANGEABLE FILM CHAMBERS

[76] Inventor: Derek V. Prosser, 4418 Perry St., Denver, Colo. 80212

[21] Appl. No.: 190,861
[22] Filed: Jan. 24, 1994
[51] Int. Cl.$^5$ ............ G03B 19/06; G03B 19/10
[52] U.S. Cl. .................... 354/210; 354/174
[58] Field of Search ............ 354/210, 288, 174, 175

[56] References Cited

U.S. PATENT DOCUMENTS

| | | | |
|---|---|---|---|
| 2,584,373 | 2/1952 | Thompson | 354/210 |
| 2,616,342 | 11/1952 | Thompson | 354/210 |
| 2,672,796 | 3/1954 | Incledon | 354/210 |
| 2,693,137 | 11/1954 | Roehrig | 354/210 |
| 4,290,680 | 9/1981 | Muramatsu et al. | 354/288 |

Primary Examiner—Michael L. Gellner
Assistant Examiner—Nicholas J. Tuccillo
Attorney, Agent, or Firm—Thomas C. Naber

[57] ABSTRACT

A photographic camera having a camera body and a plurality of film-bearing film chambers positionable within respective portions of a receiving chamber within the camera body. The camera body has a single lens situated in alignment with one of the portions of the receiving chamber, and each of the film chambers has a shutter which is opened when that particular film chamber is positioned in the receiving chamber portion having the lens. The remaining film chambers are positioned within the other portions of the receiving chamber and can be individually withdrawn for subsequent placement in the lens-bearing portion of the receiving chamber when the original film chamber is removed. The film chambers preferably are two in number and are pivotally attached to the camera body such that one film chamber can be pivotally removed from the lens-bearing portion and slid downwardly while the second film chamber can be pivotally removed from the non lens-bearing portion and slid upwardly for placement into the lens-bearing portion. In this manner, different types of film can be available for use within a single camera.

10 Claims, 1 Drawing Sheet

CAMERA HAVING INTERCHANGEABLE FILM CHAMBERS

BACKGROUND OF THE INVENTION

This invention relates generally to a camera, and in particular to a camera having a plurality of film chambers selectively alignable with the lens of the camera to thereby provide a photographer with a single camera having a plurality of readily available film choices.

The art of photography, whether by a professional or an amateur photographer, is a creative endeavor which benefits from individual style as well as from film media selected for particular subject matter. Two primary film types are color film and black-and-white film, and within these two categories are a selection of presentations (e.g. slides or paper prints) and film speeds appropriate to the scene to be photographed.

Since, for example, a photographer may wish to photograph one particular scene in black-and-white and another particular scene in color during one photography session, it has been necessary for that photographer either to carry two cameras each loaded with the appropriate film type, or to use one camera and remove and replace film in that camera. In the former situation, it is inconvenient and potentially expensive to have two cameras available at all times. In the latter situation where film is removed and replaced, the photographer can potentially lose a significant amount of time (and possibly subject matter) during the film change, as well as a loss of film usage. It is therefore apparent that a need is present for a camera that has the capability to simultaneously provide more than one type of film for selection by its user.

Accordingly, a primary object of the present invention is to provide a camera having a plurality of film chambers each capable of housing a different type of film.

Yet another object of the present invention is to provide a camera having a plurality of film chambers each positionable as desired in communication with the lens of the camera.

Still another object of the present invention is to provide a camera which conveniently houses a plurality of film chambers for rapid interchangeability and selective photography.

These and other objects of the present invention will become apparent throughout the description of the invention which now follows.

SUMMARY OF THE INVENTION

The present invention is a photographic camera comprising a plurality of film chambers for housing film, and a camera body. Each of the film chambers comprises a top wall, opposite first and second side walls, a bottom wall, a front wall and a back wall. The front wall has an openable chamber shutter means disposed therein, and each chamber has a film advancement means. The camera body comprises a top wall, opposite first and second side walls, a bottom wall, a front wall, and a receiving chamber defined by the top, side and bottom walls. The receiving chamber has a plurality of receiving portions, with each of these receiving portions capable of releasably receiving one of the film chambers. The front wall of the camera body has a shutter-operable lens means disposed therethrough in alignment with one receiving portion of the receiving chamber and in alignment with the chamber shutter means of a film chamber situated therein. Opener means within the camera body cooperate with the chamber shutter means of the film chamber situated within the receiving portion which is in alignment with the lens means of the camera body to thereby open the chamber shutter means and establish communication between the lens and the film within the film chamber. In the preferred embodiment there are two film chambers pivotally attached to the camera body and interchangeably slidable between engagement within the receiving portion bearing the lens means and a second portion of the receiving chamber for storage. In this manner, a single camera with a single lens means can provide a plurality of film types for immediate use through a convenient interchange of film chambers each housing a different type of film as deemed appropriate by the photographer.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
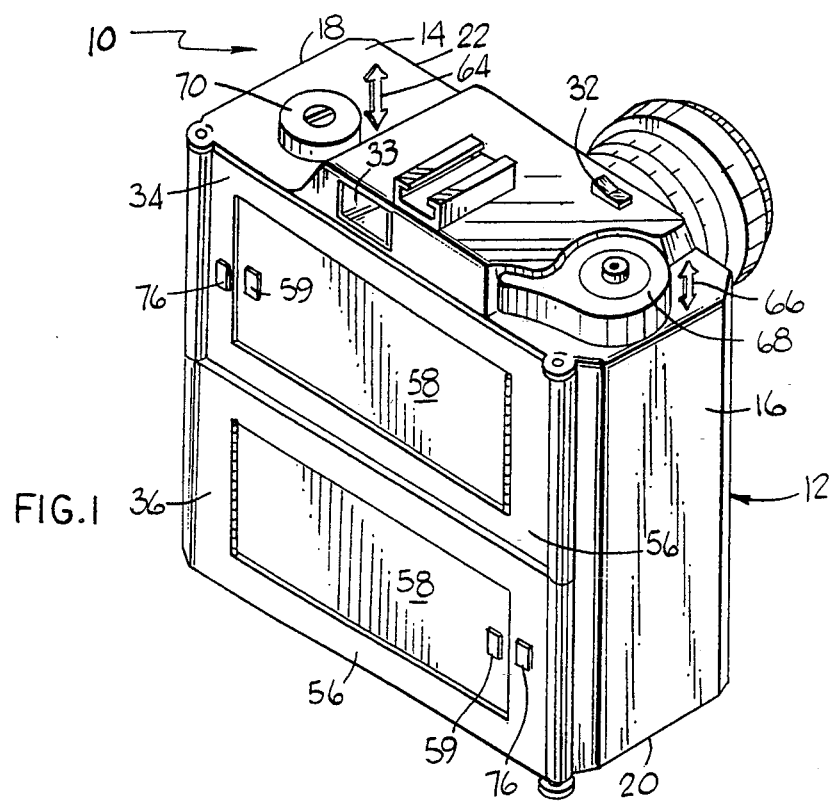
FIG. 1 is a perspective view of a camera having two interchangeable film chambers, each in a closed configuration.
Figure 2:
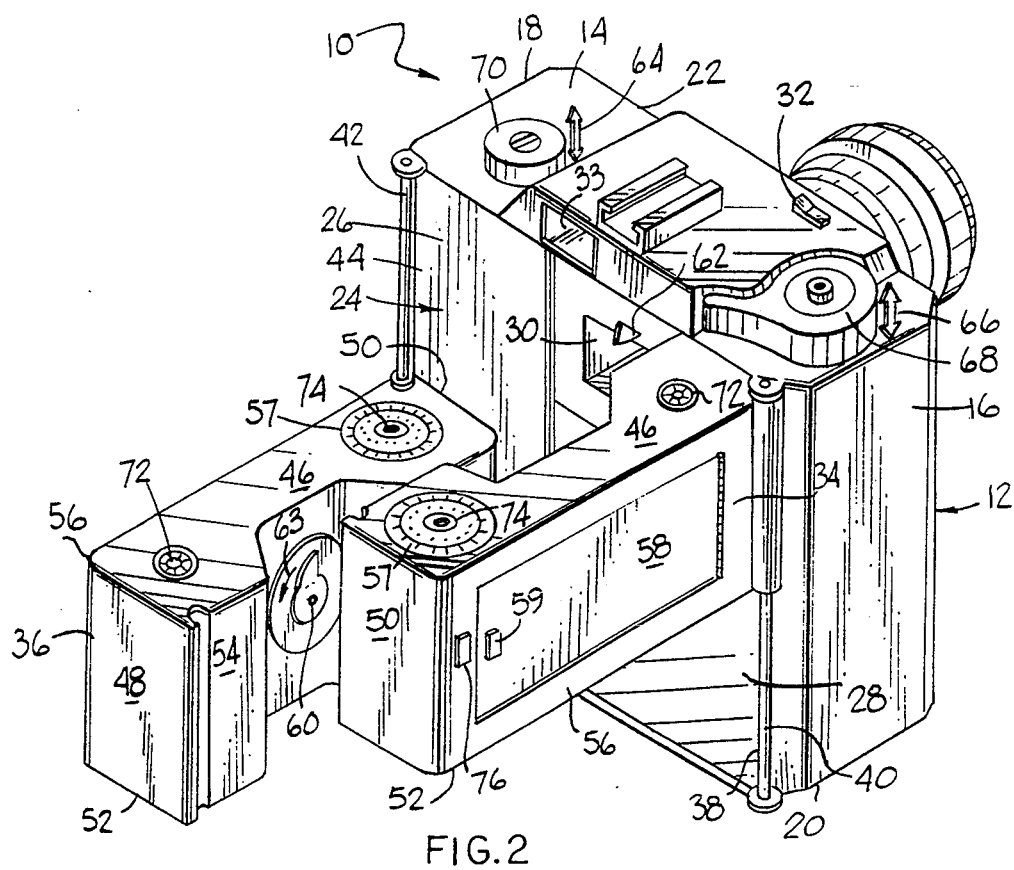
FIG. 2 is a perspective view of the camera of FIG. 1, with each film chamber shown in an open configuration.

Referring to FIGS. 1 and 2, a single lens camera 10 is illustrated. The camera 10 includes a camera body 12 having a top wall 14, opposite first and second side walls 16, 18, a bottom wall 20 and a front wall 22. All of these walls cooperate to define a receiving chamber 24 having an upper portion 26 and a lower portion 28. A shutter-operable lens means 30 is disposed through the front wall 22 and is in alignment with the upper portion 26 of the receiving chamber 24. Operation of the lens shutter is accomplished by depressing a button 32, disposed through the top wall 14 of the camera body 12, as known in the art. A standard view finder 33 is situated on the top wall 14 of the camera body 12.

Pivotally attached to the camera body 12 is a first film chamber 34 and a second film chamber 36 for housing film. Each film chamber 34, 36 has a top wall 46, opposite first and second side walls 48, 50, a bottom wall 52, a front wall 54 contoured to cooperate with the lens means 30, and a back wall 56 which is provided with a releasably securable hinged door 58 having a releasing knob 59 as known in the art through which film can be introduced or withdrawn. The front wall 54 of each film chamber 34, 36 is provided with a standard spring-closure shutter means 60 which is opened in the direction of the arrow 63 by an opener means here being a projecting pin 62 extending from the lens means 30. Such opening of the shutter means 60 occurs when the film chamber 34 or 36 is in a closed position in the upper portion 26 of the receiving chamber 24. When a film chamber 34 or 36 is not in a closed position within the upper portion 26 of the receiving chamber 24, then the shutter means 60 is closed to thereby exclude light from the film chamber. This shutter opening mechanism is known in the art. When a film chamber 34 or 36 is in place in the upper portion 26 of the receiving chamber 24, the lens means 30 is in alignment with the shutter means 60, and the shutter means 60 is open.

In the preferred embodiment, each film chamber 34, 36 is constructed to accept a standard roll of film. Through the top wall 46 of each film chamber 34, 36, a standard film advancement gearing mechanism 72 is provided and extends within the film chamber 34 or 36 to accept a leading portion of a roll of film for ultimate advancement of the film as photographs are taken. Additionally, through the top wall 46 of each film chamber 34, 36, a standard rewind gearing mechanism 74 is provided and extends within the film chamber 34 or 36 for ultimate rewinding of the film after all photographs have been taken. Surrounding each rewind gearing mechanism 74 is a standard film counter mechanism 57 as known in the art to thereby report remaining exposures on a roll of film in the particular film chamber 34 or 36. Through the top wall 14 of the camera body 12 are a film advance drive shaft 68 mechanism and a film rewind drive shaft mechanism 70, with both drive shaft mechanisms 68, 70 movable by hand upwardly and downwardly as shown by the double arrows 64, 66 in relation to the top wall 14 of the camera body 12 to thereby be projectible manually into the upper portion 26 of the receiving chamber 24. When a film chamber 34 or 36 is in place in the upper portion 26 of the receiving chamber 24, the drive shafts 68, 70 are projected inwardly to thereby engage the two gearing mechanisms 72, 74 and permit a user to advance and rewind the film residing inside the film chamber 34 or 36 by rotating the drive shaft mechanisms 68, 70. It is to be understood, of course, that electronic film advancement and rewinding can be employed as known in the art instead of the manual operation here described.

As stated above, each film chamber 34, 36 in the preferred embodiment is pivotally attached to the camera body 12. Such pivotal attachment is accomplished by providing a first pivotal shaft 38 disposed adjacent the proximal edge 40 of the first side wall 16 of the camera body 12, and a second pivotal shaft 42 disposed adjacent the proximal edge 44 of the second side wall 18. The first film chamber 34 has an aperture disposed at the intersection of its first side wall 48 and its back wall 56, and the first pivotal shaft 38 extends therethrough. The second film chamber 36 has an aperture disposed at the intersection of its second side wall 50 and its back wall 56, and the second pivotal shaft 42 extends therethrough.

To releasably secure each film chamber 34, 36 in place, whether it be in the upper portion 26 or the lower portion 28 of the receiving chamber, each is frictionally engaged with the respective upper or lower portion 26 or 28 of the receiving chamber 24. Each of the film chambers 34, 36 is provided with a knob 76 which permits a user to withdraw the film chamber from the receiving chamber 24 by grasping and pulling the knob 76 outwardly.

The camera body 12 and film chambers 34, 36 in the preferred embodiment are constructed of plastic as known in the art, while the lens means 30, shutter means 60 and gearing means 72, 74 are constructed of appropriate material or material combinations all as known in the art.

While the preferred embodiment illustrates two film chambers that are pivotally attached to the camera body, it is to be understood that the film chambers do not need to be attached to the camera body, but, instead, and by way of non-limiting example, can be constructed to snap in place as by friction fit into any portion of the receiving chamber of the camera body. Further, the number of film chambers that can be accommodated by the camera body can exceed two by merely dimensioning the camera body such that the receiving chambers is large enough to receive the number of film chambers desired.

Operation of the preferred embodiment is straight forward. Specifically, a user pivots one of the two film chambers 34 or 36 into the upper portion 26 of the receiving chamber 24 and closes it therein by friction fit. This action results in the opening of the shutter means 60 of the film chamber 34 or 36 in the upper portion 26 through the action of the projecting pin 62, and aligns that shutter means 60 with the lens means 30 of the camera body 12. If not already in place, the user then pivots the other film chamber 34 or 36 into the lower portion 28 of the receiving chamber 24. To take a photograph, the user simply looks through the view finder 33 on the top wall 14 of the camera body 12 and depresses the shutter button 32. The photographed image is thereby captured on the film inside the film chamber 34 or 36 that is positioned within the upper portion 26 of the receiving chamber 24, and the film can be advanced by rotating the film advance drive shaft 68 in a usual manner. When the user desires to change to the film residing in the film chamber 34 or 36 positioned in the lower portion 28 of the receiving chamber, the user moves the drive shafts 68, 70 upwardly and then simultaneously disengages both film chambers 34, 36 from the receiving chamber 24 and pivots both film chambers outwardly. Such removal of the film chamber 34 or 36 originally positioned in the upper portion 26 of the receiving chamber 24 also closes the shutter means 60 of that film chamber. The film chamber 34 or 36 removed from the upper portion 26 is then slid downwardly on the respective pivotal shaft 38 or 42, and the film chamber 34 or 36 in the lower portion 28 is slid upwardly on the respective pivotal shaft 38 or 42 toward the upper portion 26 of the receiving chamber 24 for placement therein as described above. The downwardly-slid film chamber 34 or 36 is likewise placed within the lower portion 28 of the receiving chamber 24. In this manner, a photographer can quickly and conveniently alternate between desired film types to thereby photograph subject matter in the film medium wanted.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

I claim:

1. A photographic camera comprising:
   a) a plurality of film chambers for housing film, with each of said film chambers comprising a top wall, opposite first and second side walls, a bottom wall, a front wall and a back wall, with said front wall having an openable chamber shutter means disposed therein, and with each chamber having a film advancement means;
   b) a camera body comprising a top wall, opposite first and second side walls, a bottom wall, a front wall, and a receiving chamber defined by the top, side and bottom walls, said receiving chamber having a plurality of receiving portions, with each of said receiving portions capable of releasably receiving one of the film chambers, with said front wall having a shutter-operable lens means disposed therethrough in alignment with one receiving portion of the receiving chamber and in alignment with the chamber shutter means of a film chamber situated therein; and c) opener means within the camera body which cooperates with the chamber shutter means of the film chamber situated within the receiving portion in alignment with the lens means of the camera body to thereby open the chamber shutter means.

2. A photographic camera as claimed in claim 1 having two receiving portions within the receiving chamber and two film chambers.

3. A photographic camera as claimed in claim 2 wherein each film chamber is pivotally attached to the camera body and movable into either receiving portion not occupied by the other film chamber.

4. A photographic camera comprising:
a) a first film chamber for housing film and a second film chamber for housing film, with each of said film chambers comprising a top wall, opposite first and second side walls, a bottom wall, a front wall and a back wall, with said front wall having an openable chamber shutter means disposed therein, and with each chamber having a film advancement means;

b) a camera body comprising a top wall, opposite first and second side walls each having a proximal edge, a bottom wall, a front wall, and a receiving chamber defined by the top, side and bottom walls, said receiving chamber having an upper receiving portion and a lower receiving portion, with each of said receiving portions capable of releasably receiving one of the film chambers, with said front wall having a shutter-operable lens means disposed therethrough in alignment with one of the receiving portions of the receiving chamber and in alignment with the chamber shutter means of a film chamber situated therein; and c) opener means within the camera body which cooperates with the chamber shutter means of the film chamber situated within the receiving portion in alignment with the lens means to thereby open the chamber shutter means.

5. A photographic camera as claimed in claim 4 wherein the film chambers are pivotally attached to the camera body.

6. A photographic camera as claimed in claim 4 wherein the lens means is in alignment with the upper receiving portion of the receiving chamber.

7. A photographic camera as claimed in claim 4 wherein the camera body has a first pivotal shaft disposed adjacent the proximal edge of the first side wall and a second pivotal shaft disposed adjacent the proximal edge of the second side wall, and wherein the first film chamber has an aperture disposed at the intersection of the first side wall and the back wall and through which the first pivotal shaft extends, and the second film chamber has an aperture disposed at the intersection of the second side wall and the back wall and through which the second pivotal shaft extends.

8. A photographic camera as claimed in claim 7 wherein the lens means is in alignment with the upper receiving portion of the receiving chamber.

9. A photographic camera as claimed in claim 4 wherein an exteriorly-operable film advancement means extends through a wall of the camera body and cooperates with the film advancement means of the film chamber situated in the portion of the receiving chamber with which the lens means is in alignment.

10. A photographic camera as claimed in claim 9 wherein the lens means is in alignment with the upper portion of the receiving chamber.

* * * * *